(12) United States Patent
Kado

(10) Patent No.: US 7,868,940 B2
(45) Date of Patent: Jan. 11, 2011

(54) IMAGE CAPTURE DEVICE

(75) Inventor: Yoshiyasu Kado, Nara (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 12/193,066

(22) Filed: Aug. 18, 2008

(65) Prior Publication Data

US 2009/0051802 A1  Feb. 26, 2009

(30) Foreign Application Priority Data

Aug. 22, 2007  (JP) .............................. 2007-215468

(51) Int. Cl.
*H04N 5/225* (2006.01)
*H04N 5/76* (2006.01)
*H04N 5/278* (2006.01)

(52) U.S. Cl. ............................... 348/333.02; 348/231.5; 348/239

(58) Field of Classification Search ............... 348/231.5, 348/239, 333.01, 333.02, 333.12
See application file for complete search history.

(56) References Cited

U.S. PATENT DOCUMENTS

| | | | | |
|---|---|---|---|---|
| 7,075,570 B2 * | 7/2006 | Nagaoka | ................... | 348/231.2 |
| 7,359,003 B1 * | 4/2008 | Knighton et al. | ............. | 348/373 |
| 2004/0032519 A1 * | 2/2004 | Oda et al. | .................... | 348/294 |
| 2005/0151854 A1 * | 7/2005 | Maki | ........................ | 348/222.1 |
| 2008/0168075 A1 * | 7/2008 | Kamiyabu | ................... | 707/100 |

FOREIGN PATENT DOCUMENTS

| | | |
|---|---|---|
| JP | 2001-051778 | 2/2001 |
| JP | 2005-092521 | 4/2005 |
| JP | 2006-109135 | 4/2006 |
| JP | 2006-303573 | 11/2006 |

\* cited by examiner

*Primary Examiner*—Jason Whipkey
(74) *Attorney, Agent, or Firm*—Renner, Otto, Boisselle & Sklar, LLP

(57) ABSTRACT

An image capture device according to the present invention includes: a display section to show a dialog box that allows the user of the device to edit character information, the dialog box including an entry option field where at least one character is proposed as an entry option and a selected character display field where characters that have been selected from those options are presented; a first operating interface that allows the user to move a first cursor, which is located in the entry option field, within the dialog box; and a second operating interface that allows the user to move a second cursor, which is located in the selected character display field, within the dialog box.

10 Claims, 8 Drawing Sheets

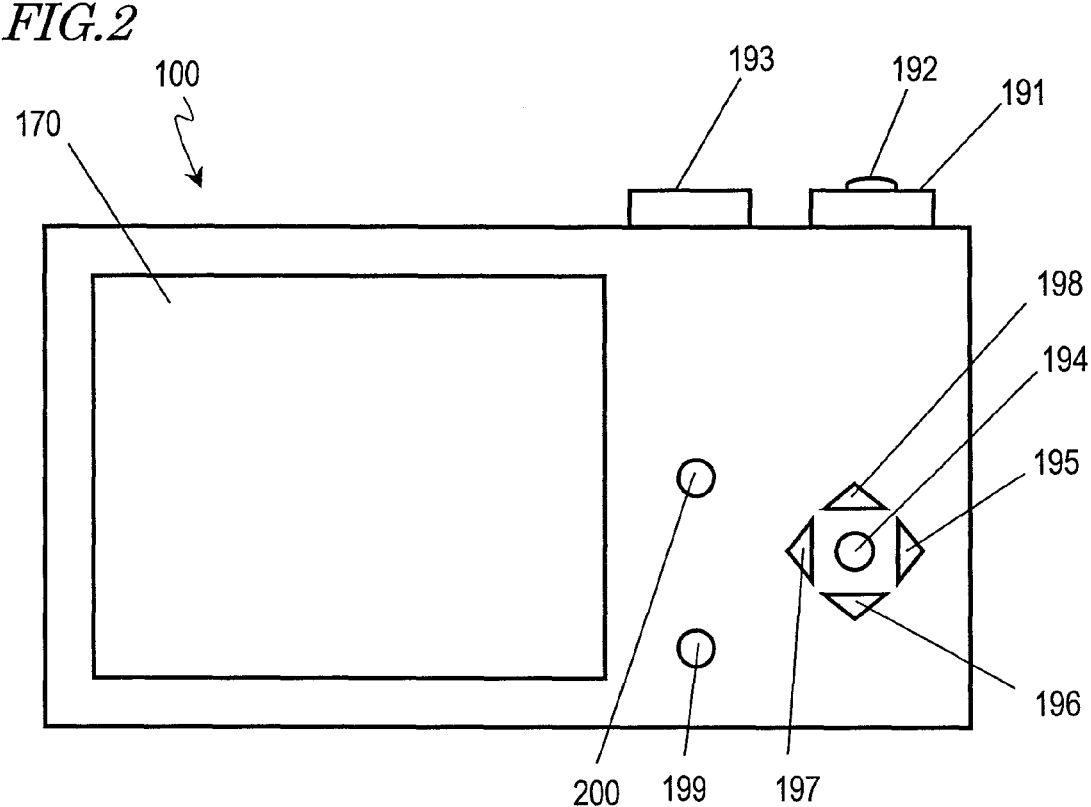
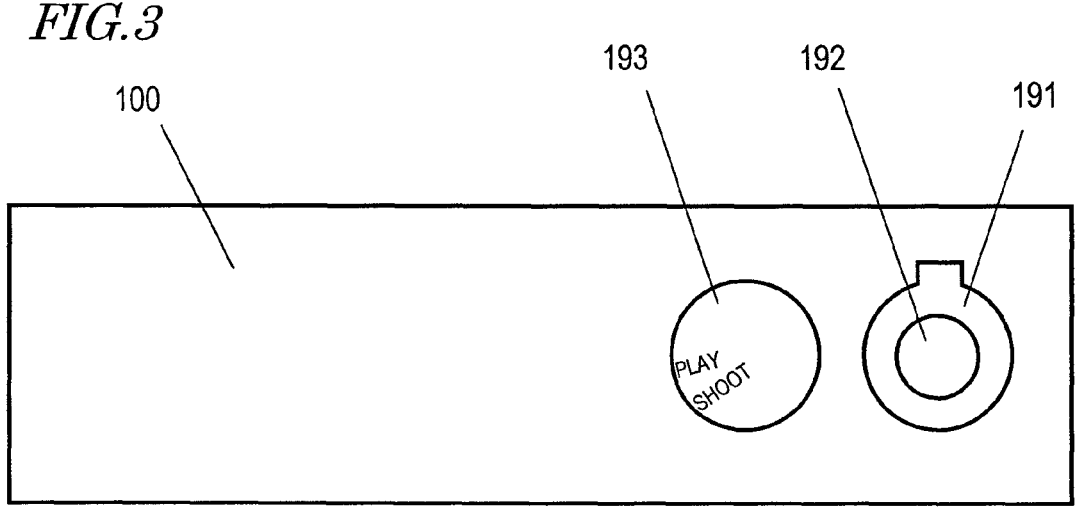

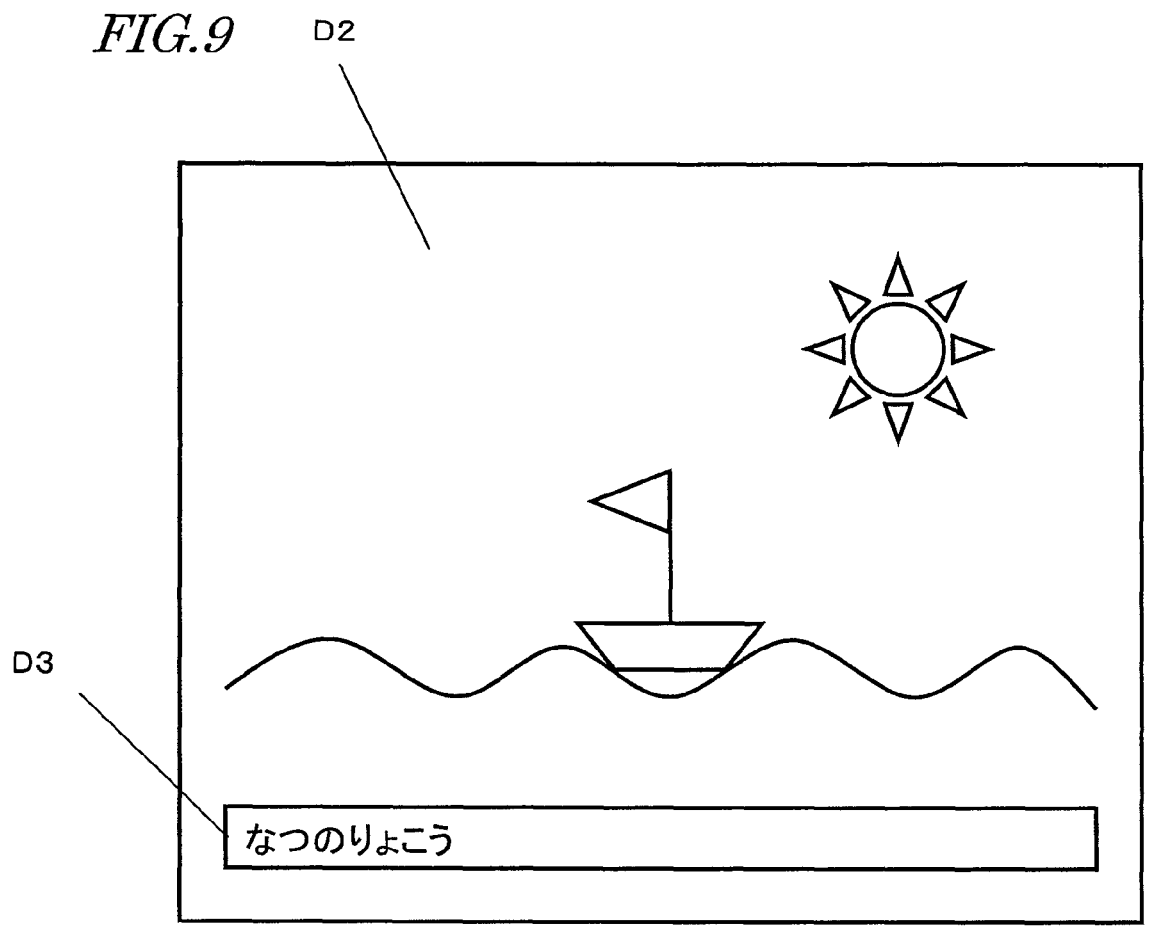

IMAGE CAPTURE DEVICE

BACKGROUND OF THE INVENTION

1. Field of the Invention

The present invention relates to an image capture device such as a digital camera.

2. Description of the Related Art

Digital cameras and digital camcorders have become so popular nowadays that people have more and more opportunities to use those electronic devices. Meanwhile, as the storage capacities of memory cards available have become bigger and bigger these days, the numbers of still pictures or movies to shoot have been increasing by leaps and bounds for the users of those electronic devices.

In view of the circumstances such as these, if the user can immediately give some title or memo to every image he or she has just taken, it will be much more convenient for him or her to check the images afterward. That is why there is a high demand for an interface that allows the user of an electronic device such as a digital camera to enter characters more easily. That is to say, there is a growing demand for devices that are even easier to use in entering some title, memo and so on.

For example, Japanese Patent Application Laid-Open Publication No. 2006-109135 discloses a device, e.g., a digital camera, that allows the user to enter characters with a simple input key such as a cross key. This device displays potential characters to enter on the screen and allows the user to choose one of them. Then, the characters can be entered with simple key manipulations.

Another Japanese Patent Application Laid-Open Publication No. 2005-92521 discloses a cell-phone that displays a selection cursor to allow the user to select one of potential characters and an input cursor to appear in a character string thus selected on a character entry dialog box. In this document, a character is selected using disk-type jog-dial and its push button, and options which are associated with the selected character are displayed. Then one of the options is selected using the jog-dial.

Recently, however, as the age range of users of those electronic devices has been widening, there is a growing demand for an interface that allows a user of any age to enter characters and edit the entered characters even more easily.

An object of the present invention is to provide an interface that allows the user to enter characters more easily than any conventional character input interface.

SUMMARY OF THE INVENTION

An image capture device according to the present invention includes: a display section to show a dialog box that allows the user of the device to edit character information, the dialog box including an entry option field where at least one character is proposed as an entry option and a selected character display field where characters that have been selected from those options are presented; a first operating interface that allows the user to move a first cursor, which is located in the entry option field, within the dialog box; and a second operating interface that allows the user to move a second cursor, which is located in the selected character display field, within the dialog box.

In one preferred embodiment of the present invention, the device includes a zooming interface that allows the user to change the sizes of a subject's image when the dialog box is not shown. The zooming interface is used as the second operating interface as well.

In this particular preferred embodiment, the image capture device further includes a controller for controlling the movement of the second cursor as the second operating interface is manipulated. The controller controls the directions in which the second cursor moves such that one of those directions is associated with an increase in the size of the subject's image, and the other direction is associated with a decrease in the size of the subject's image, caused by manipulating the zooming interface.

In still another preferred embodiment, the image capture device further includes: a controller for controlling the movement of the first cursor as the first operating interface is manipulated and also controlling the mode of display of the dialog box; and a third operating interface. The controller makes the display section propose multiple types of character options on the entry option field, select the type of the character where the first cursor is located as the third operating interface is manipulated, and change the entry option fields presented in the dialog box according to the type of the character selected.

In this particular preferred embodiment, the entry option field includes at least a first subfield and a second subfield. If the characters that have been selected with the first operating interface have a character system including multiple characters that have been classified into multiple groups, then the controller makes the display section propose representative characters of the respective groups in the first subfield and also propose at least one more character, belonging to the same group as one of the representative characters that has been selected in the first subfield, in the second subfield.

In a specific preferred embodiment, as the first operating interface is manipulated, the controller selects the character that is displayed at the first cursor in at least one of the first and second subfields.

In yet another preferred embodiment, if the characters that have been selected with the first operating interface have a character system including multiple characters that are not classified into multiple groups, then the controller makes the display section present the multiple characters in the entry option field.

In yet another preferred embodiment, the first and second operating interfaces are mutually different types of hardware interfaces.

In yet another preferred embodiment, the first and third operating interfaces are mutually different types of hardware interfaces.

Alternatively, the first and third operating interfaces may be the same type of hardware interfaces.

According to the present invention, a first cursor, which appears in an entry option field where at least one character is proposed as an option, is moved with a first operating interface, while a second cursor, which appears in a selected character display field where characters selected from the options are displayed, is moved with a second operating interface. That is to say, characters yet to be selected and characters already selected are handled with two different operating interfaces. Consequently, these two groups of characters can be handled definitely differently from each other. As a result, characters can be entered and the entered characters can be changed easily and smoothly.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2 illustrates exemplary operating interfaces 190 arranged on the rear side of the digital camera 100.

FIG. 3 illustrates exemplary operating interfaces 190 arranged on the top surface of the digital camera 100.

FIG. 9 illustrates a character string D3 superimposed on an image D2.

DETAILED DESCRIPTION OF PREFERRED EMBODIMENTS

Hereinafter, preferred embodiments of an image capture device according to the present invention will be described with reference to the accompanying drawings. Specifically, the internal and external configurations of the image capture device will be described first with reference to FIG. 1 to 3, and then it will be described with reference to FIGS. 4 and 5 how the image capture device operates. After that, it will be described with reference to FIGS. 6 to 9 how to handle this device and what will be displayed on the screen in entering characters, which is one of major features of this image capture device.

Figure 1:
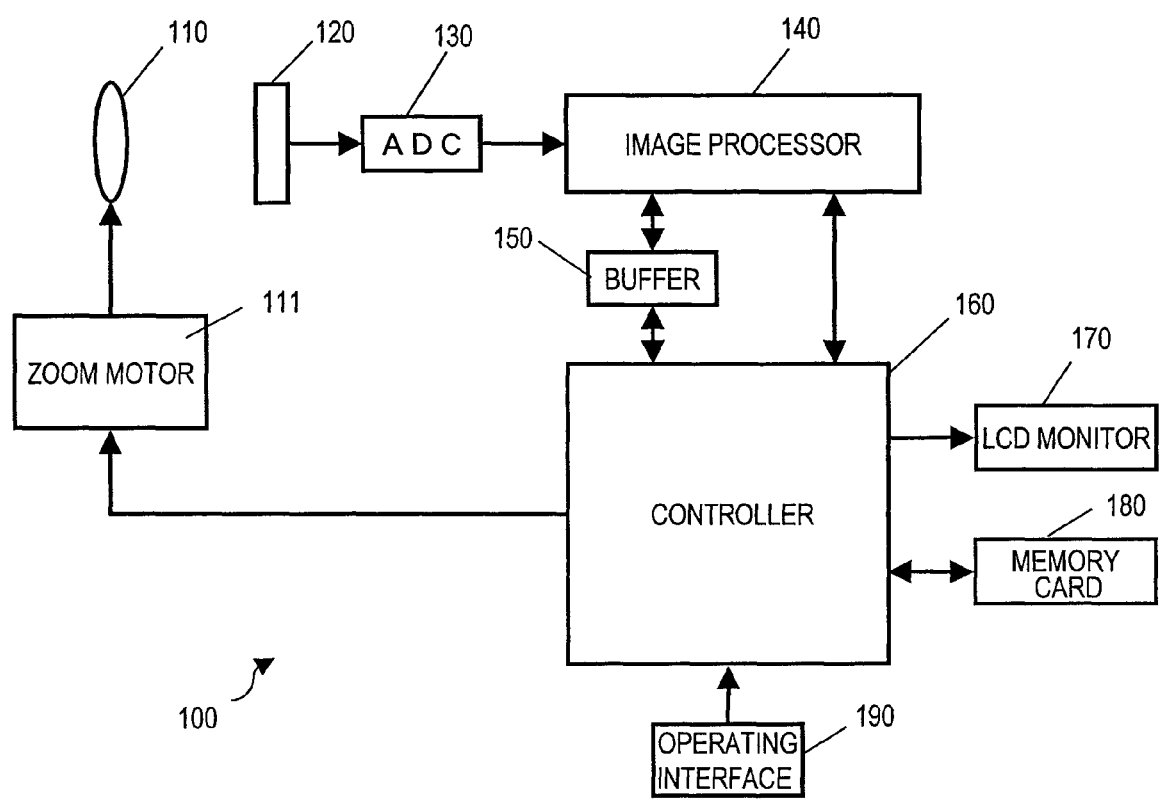
FIG. 1 is a block diagram illustrating a configuration for a digital camera 100 as a preferred embodiment of the present invention.

FIG. 1 is a block diagram illustrating a configuration for a digital camera 100 as a preferred embodiment of the present invention. The digital camera 100 includes a zoom lens 110, a zoom motor 111, a CCD image sensor 120, an A/D converter 130, an image processor 140, a buffer 150, a controller 160, an LCD monitor 170, and an operating interface 190. A memory card 180 is also shown in FIG. 1 just for convenience sake. This is because the memory card 180 is usually removable from the digital camera 100 and does not form part of the digital camera 100.

The zoom lens 110 is used to change the sizes of a subject's image. The zoom motor 111 is used to drive the zoom lens 110 in the optical axis direction. While the character information editing dialog box (to be described later) is not shown (e.g., during a shooting operation), a zoom lever 191 is turned by the user and an instruction signal representing that operation is generated. Then, the zoom motor 111 drives the zoom lens 110 in accordance with a control signal. In this preferred embodiment, the zoom powers are supposed to be changed optically. Alternatively, the zoom powers may also be change electronically. In the latter case, in accordance with a control signal that is generated when the zoom lever 191 is turned by the user, the image processor 140 subjects the image data, which has been generated by the CCD image sensor 120, to zoom processing.

The CDD image sensor 120 receives the subject's image that has been produced by an optical system and generates an electrical signal representing the intensity of the light received. This electrical signal is an image signal representing the subject's image. Although the CCD image sensor 120 is used in this preferred embodiment, a CMOS image sensor or an NMOS image sensor may also be used instead.

The A/D converter 130 converts the (analog) electrical signal that has been generated by the CCD image sensor 120 into a digital one. In this manner, digital image data can be obtained.

The image processor 140 subjects the image data that has been provided by the A/D converter 130 to various types of image processing, which include spot correction, gamma correction, white balance correction, YC conversion processing, electronic zoom processing, compression processing and decompression processing. The image processor 140 may be designed so as to perform either all of these various types of processing or just some of them. If necessary, the image processor 140 may also be designed to perform any other type of processing.

In response to the action that has been done on the operating interface 190, the controller 160 controls the entire digital camera 100. In that case, the buffer memory 150 functions as a work memory for the controller 160. The buffer memory 150 may also function as a work memory for the image processor 140.

The LCD monitor 170 receives the image data to present that has been generated by the image processor 140 and presents an image represented by the image data. The LCD monitor 170 can also make an OSD (On Screen Display) operation such that some character information is superimposed on an image shot.

The memory card 180 can store the image data that has been generated by the image processor 140 and then supplied from the controller 140. The memory card 180 can also output the image data that is stored in itself. On receiving the image data from the memory card 180, the controller 160 has the image processor 140 generate image data to present and can get an image, represented by the image data, presented on the LCD monitor 170.

The operating interface 190 is a hardware interface that is provided to allow the user to do various actions on this device. Specifically, the operating interface 190 is implemented as any of various types of buttons or levers. In the following description, the operating interface 190 will sometimes be used herein as a generic term that refers to all of those various types of operating means in general and sometimes refer herein to just one specific operation means for the sake of convenience.

FIGS. 2 and 3 illustrate examples of operating interfaces 190, which are arranged on the rear and top surfaces of the digital camera 100. The operating interfaces 190 shown in FIGS. 2 and 3 include a zoom lever 191, a shutter release button 192, a mode dial 193, an ENTER button 194, a RIGHT arrow key 195, a DOWN arrow key 196, a LEFT arrow key 197, an UP arrow key 198, a DELETE button 199 and a DISPLAY button 200.

Hereinafter, the respective operating interfaces 190 will be described.

The zoom lever 191 is arranged so as to turn around the shutter release button 192. As the user turns the zoom lever 191, a control signal is generated according to the direction, degree and duration of that rotation, and the controller 160 changes the zoom powers in accordance with that control signal. As a result, the subject's image that he or she is going to shoot or that has been read from the memory card 180 and presented on the LCD monitor 170 changes its sizes.

According to how deep the user has pressed it down, the shutter release button 192 changes the types of control signals to output to the controller 160. For example, if the shutter release button 192 has been pressed down halfway, a control signal that sets off an autofocusing operation and an automatic exposure control operation is output. On the other hand, the control signal that is output when the shutter release button 192 has been pressed down fully will trigger a shooting operation.

The mode dial 193 is also turned by the user who is going to specify his or her desired mode of operation of the digital camera 100. As the mode dial 193 is turned, the controller 160 receives an instruction from the mode dial 193 and changes the modes of operation of the digital camera 100 following the instruction.

The ENTER button 194 is used to determine various types of settings. The RIGHT arrow key 195 may be used to move the cursor on the setting dialog box to the right or to change the images to present forward, for example. The DOWN arrow key 196 may be used to move the cursor on the setting dialog box downward, for example. The LEFT arrow key 197 may be used to move the cursor on the setting dialog box to the left or to change the images to present backward, for example. And the UP arrow key 198 may be used to move the cursor on the setting dialog box upward, for example.

The DELETE button 199 is used to delete the image data that is stored in the memory card 180. The DISPLAY button 200 is used to change the layouts of the dialog box being shown on the LCD monitor 170.

Hereinafter, it will be described how the digital camera 100 with such a configuration operates. The digital camera 100 operates differently when turned ON, while shooting, while presenting an image shot, and while deleting the image data stored. In the following example, it will be described how the digital camera 100 operates in the mode of presenting images shot, which relates with the present embodiment. In the preferred embodiment to be described below, title editing processing is supposed to be carried out in the presentation mode. However, this is just an example. The title editing processing may also be carried out in the recording mode or in any other mode.

Figure 4:
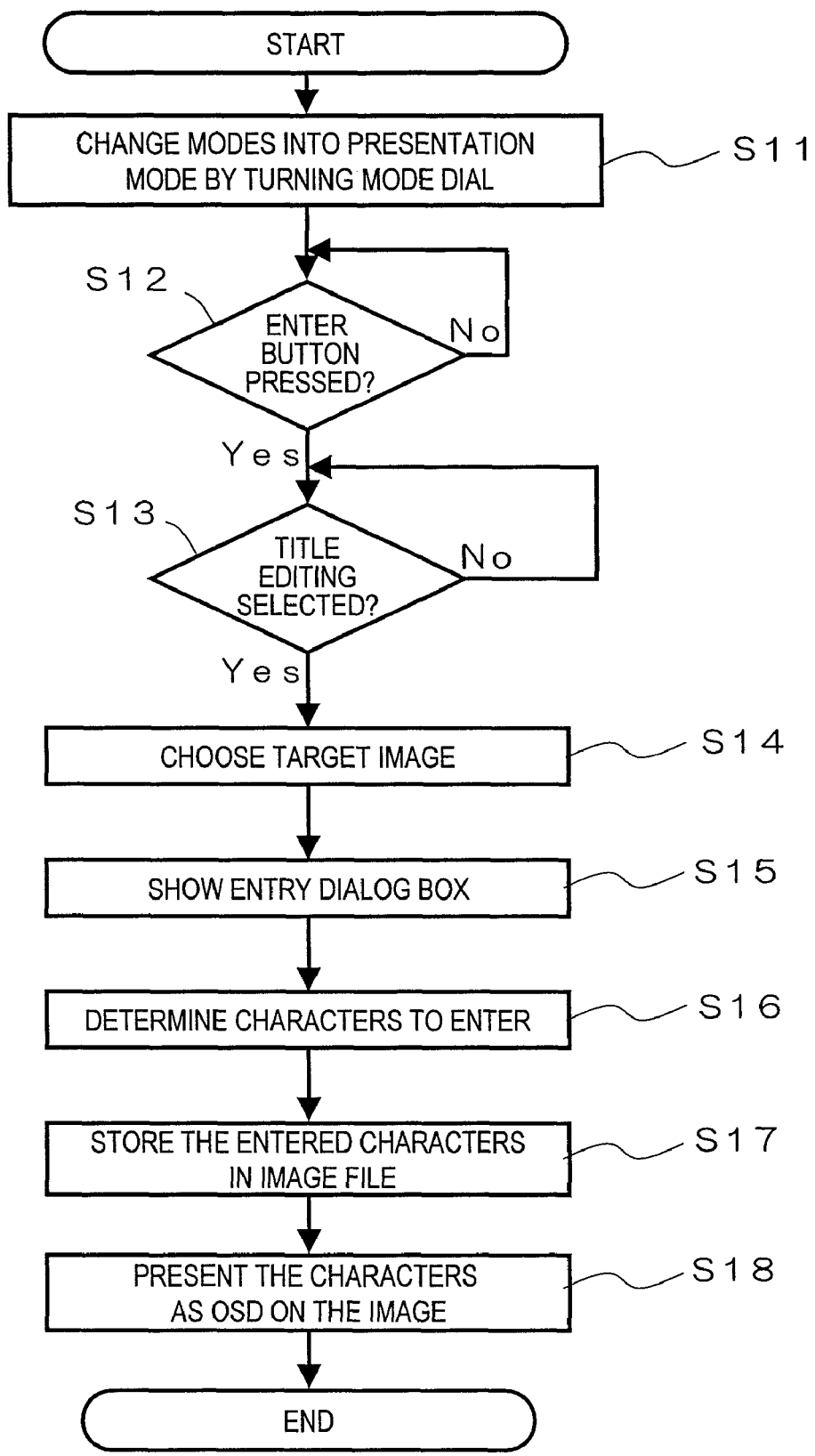
FIG. 4 is a flowchart showing the procedure of processing to be done when the mode of presenting images shot is selected.

FIG. 4 is a flowchart showing the procedure of processing to be done when the mode of presenting images shot is selected.

First, in Step S11, the user changes the modes of operation of the digital camera 100 into the presentation mode by turning the mode dial 193. In this state, the controller 160 sees if the ENTER button 194 has been pressed down (in Step S12). When finding the ENTER button 194 pressed down, the controller 160 gets a setting dialog box shown on the LCD monitor 170.

Figure 5:
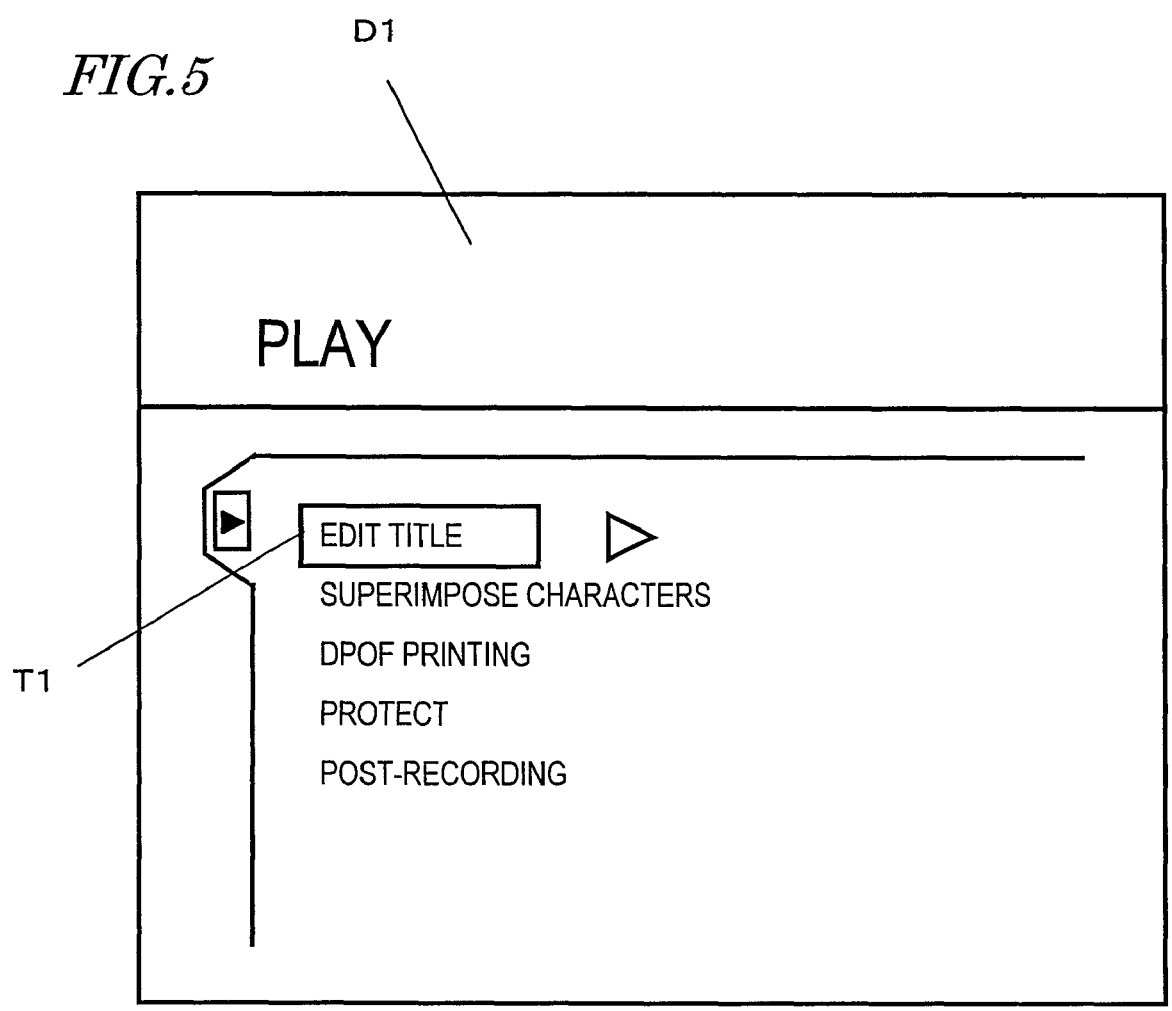
FIG. 5 illustrates an example of a setting dialog box D1.

FIG. 5 illustrates an example of a setting dialog box D1, which is shown to allow the user to make various types of settings in the presentation mode. First, the controller 160 highlights a TITLE EDITING option T1 and sees if either the RIGHT arrow key 195 or the DOWN arrow key 196 has been pressed down (in Step S13).

When finding the RIGHT arrow key 195 pressed down, the digital camera 100 performs the title editing processing, which is a type of editing processing that allows the user to enter character information to be added to an image being presented. The controller 160 reads the image data that is stored in the memory card 180 and gets preview image data generated by the image processor 140. Then, the controller displays, on the LCD monitor 170, the preview image data generated. As used herein, the "preview images" may be thumbnails of the respective images, for example.

On the other hand, when finding the DOWN arrow key 196 pressed down, the controller 160 highlights the next option. The digital camera 100 performs mutually different types of processing according to the option picked up. However, since the rest of the options shown in FIG. 5, other than the top one called "TITLE EDITING", has nothing to do with the present invention, the description thereof will be omitted herein. It should be noted that in the "NO" branch of the decision step S13 shown in FIG. 4, it is just determined whether the "TITLE EDITING" option has been selected or not.

Then, looking at the preview images displayed, the user chooses, in Step S14, one of the images on which title editing needs to be done (which will be referred to herein as an "image to be edited").

Figure 6:
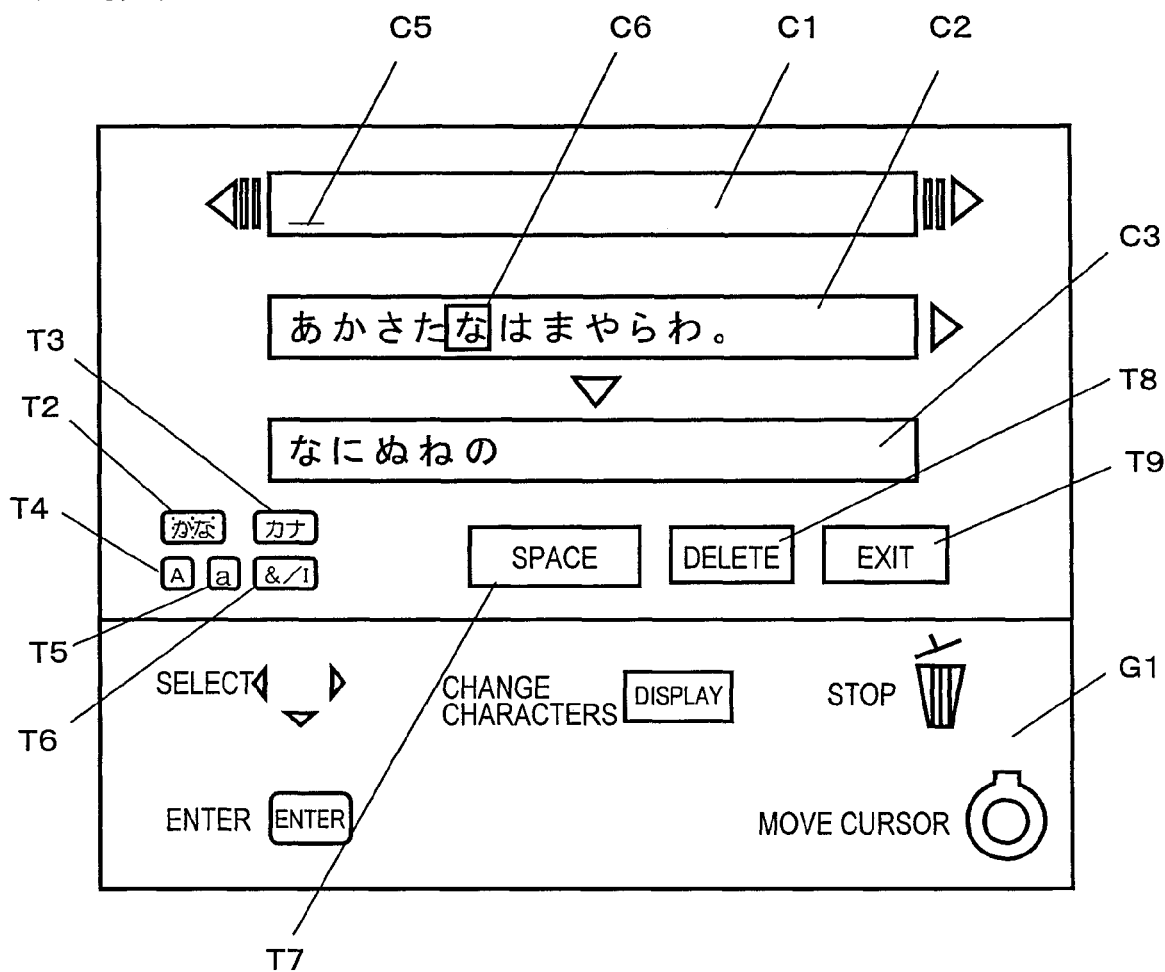
FIG. 6 shows an editing dialog box that allows the user to enter characters.

When the image to be edited is chosen, the controller 160 controls the LCD monitor 170 so as to show the entry dialog box shown in FIG. 6 (in Step S15).

Hereinafter, it will be described with reference to FIGS. 6 to 8 how to enter characters on the entry dialog box. The modes of display, character selection, and cursor movement on the entry dialog box are controlled by the controller 160.

FIG. 6 shows an editing dialog box that allows the user to enter characters. This dialog box has an entry box C1 to fill in with characters entered. That is to say, the characters that have been provisionally selected as a title for a particular image (which will be referred to herein as "selected characters") are displayed in that box C1. At the cursor C5 in the entry box C1, a selected character is displayed. Or the character located at the cursor C5 may be either deleted or changed.

On the other hand, a first entry option field C2 is a field in which several representative characters are proposed as entry options, while a second entry option field C3 is a field in which a group of characters (i.e., entry options), represented by a selected one of those representative characters, are proposed. In the example illustrated in FIG. 6, a representative character is indicated by the cursor C6. If the DOWN arrow key 196 is pressed down in this state, the cursor C6 jumps to the second entry option field C3.

One of the features of this preferred embodiment lies in that the operating interface for moving the cursor in the entry box C1 and the operating interface for moving the cursor in the first and second entry option fields C2 and C3 are not the same but provided separately.

In a conventional digital camera, the character to edit or to choose needs to be specified by moving the cursor both vertically and horizontally over the entry box C1 and the first and second entry option fields C2 and C3 with the keys 195 to 198.

On the other hand, according to this preferred embodiment, the zoom lever 191 is used to move the cursor in the entry box C1, while the keys 195 to 198 are used to move the cursor in the first and second entry option fields C2 and C3. By providing the operating interface for moving the cursor in the entry box C1 and the operating interface for moving the cursor in the first and second entry option fields C2 and C3 independently of each other, there is no need to move the cursor by tapping the keys 195 to 198 numerous times. As a result, the cursors can be moved smoothly. In particular, since the zoom lever 191 that is provided for most digital cameras currently available is used to move the cursor, there is no need to increase the number of keys or arrange an additional key but the existent keys can be used effectively.

Hereinafter, it will be described exactly what the boxes shown in FIG. 6 are and specifically how to enter characters with this dialog box.

The entry box C1 is a field in which characters that have been chosen as potential characters to enter are displayed. If the user manipulates the keys 195 to 198 to move the cursor to the END button T9 and then presses the ENTER button 194 after the entire character string to enter has been presented in the entry box C1, that character string can be stored in the header section of the image file of the image to edit. In the entry box C1, the first cursor C5 appears. As the zoom lever 191 is turned, the first cursor C5 moves in the entry box C1 character by character. Optionally, the first cursor C5 may continue to move in one direction by keeping the zoom lever 191 turned in the same direction for a predetermined amount of time or more. In response to a control signal, of which the types change according to the direction, angle and/or duration of rotation of the zoom lever 191, the controller 160 controls the movement of the first cursor C5.

In this example, it will be described how to enter a system of characters that can be classified into a number of groups. More specifically, the system of characters to enter in this example is one of the two Japanese syllabaries called "hiragana" and "katakana", each of which can be subdivided into a number of groups such as "あgyo (line)", which is the first group of five hiragana letters headed by "あ", and gyo (line)", which is the second group of five hiragana letters headed by . Also, in this example, the option T2 is supposed to be selected in the dialog box.

The first entry option field C2 is a field in which representative ones of potential characters to enter are proposed as options. Specifically, in the example illustrated in FIG. 6, ten hiragana letters belonging to the "あdan (stage)" of the syllabary are proposed in the first entry option field C2, in which the second cursor C6 is currently located. When the user taps the Right and LEFT arrow keys 195 and 197, one of multiple different types of control signals is generated according to the type of the operation instructed. And in response to that control signal, the controller 160 moves the second cursor C6.

Also, if the DOWN arrow key 196 is pressed down while the second cursor C6 is located in the first entry option field C2, the second cursor C6 jumps to the second entry option field C3. The second entry option field C3 is a field in which a group of characters to enter, represented by the representative character selected in the first entry option field C2, are proposed as entry options. Specifically, in the example illustrated in FIG. 6, the five hiragana letters "な", "に", "ぬ", "ね" and "の", all belonging to the ""なgyo (line)" headed by the selected character "な", are displayed.

However, the representative character proposed in the first entry option field C2 does not always have to be chosen from the second entry option field C3. Optionally, the representative character does not have to be presented as an index to the group of characters displayed in the second entry option field C3 but may be selected by itself from the first entry option field C2. Still alternatively, one of the representative characters may be selected from the first entry option field C2 while one of the characters is selectable from the second entry option field C3. In any case, the selection of the characters may be determined with the ENTER button 194.

The options T2 through T6 are proposed to determine the type of the characters to display in the first and second entry option fields C2 and C3. The option representing the type of characters currently selected (i.e., the option T2 in the example illustrated in FIG. 6) may be shadowed, for example. The types of characters may be changed by pressing the display button 200 a number of times. For example, every time the display button 200 is pressed, the types of characters change from hiragana into katakana, capital alphabet letters, small alphabet letters and other numerals and symbols. Alternatively, the types of characters may also be changed with the zoom lever 191 or the keys 195 to 198 instead of the display button 200.

Figure 7:
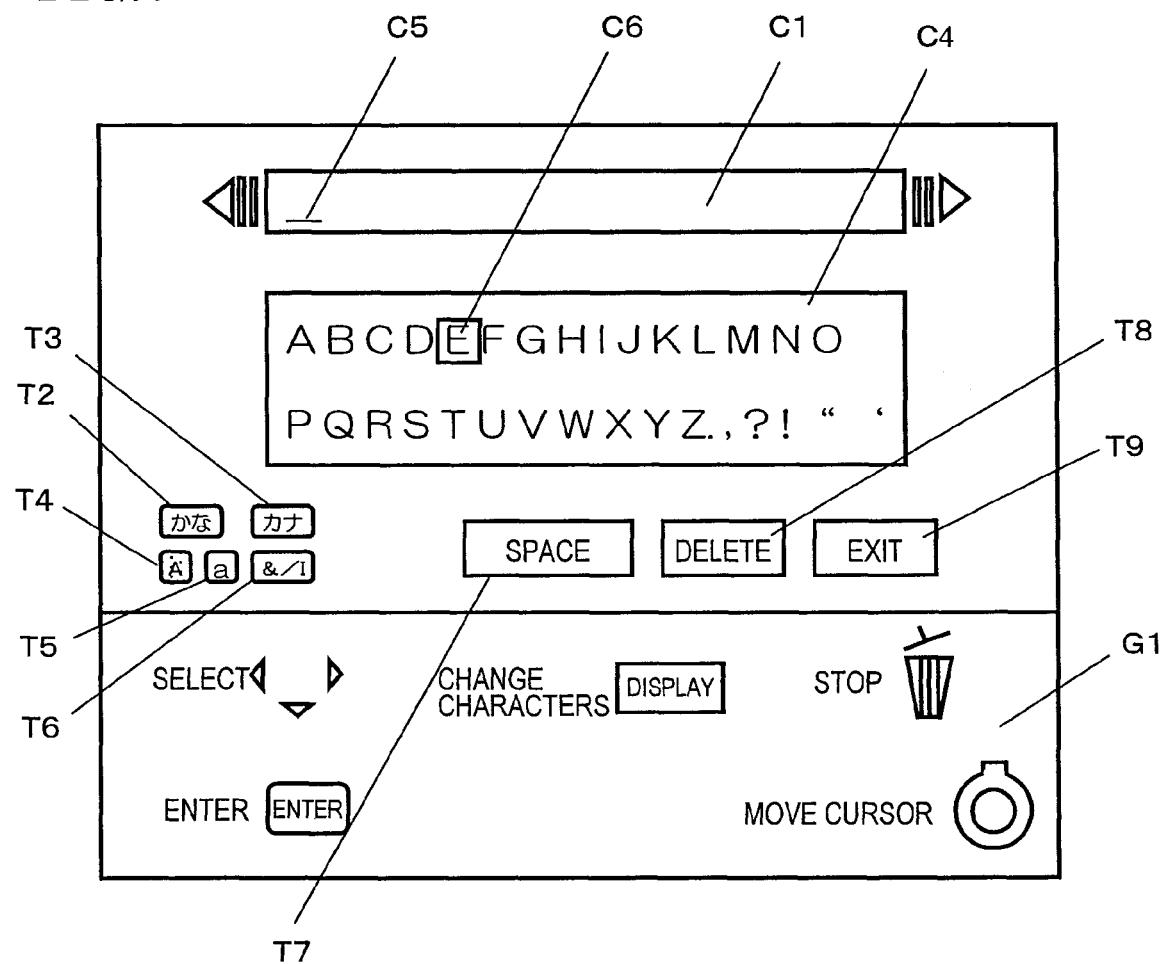
FIG. 7 illustrates an example of an entry dialog box, to which the dialog box shown in FIG. 6 may be switched.

When the capital alphabet entry option T4 is picked up by pressing the display button 200, the entry dialog box changes into the one shown in FIG. 7. As can be seen from FIG. 7, in entering characters of a simple system such as English alphabet, having no groups or representative characters of hiragana or katakana, the first and second entry option fields C2 and C3 are not shown but only a third entry option field C4 needs to be shown. That is to say, no fields to present representative characters are shown but all character options are presented in the same box. Even when the small alphabet entry option T5 is picked up, the same dialog box as the one shown in FIG. 7 appears except that the alphabet displayed are small letters.

As described above, in this preferred embodiment, when instructed to propose characters of a first type as potential characters to enter in entry option fields, the controller 160 subdivides the first type of characters into a number of groups. And the controller 160 shows two entry option fields separately on the LCD monitor 170 as a first subfield in which representative characters of the respective groups are presented and a second subfield in which characters belonging to the group headed by the representative character selected are presented, respectively.

On the other hand, when instructed to propose characters of a second type as potential characters to enter in an entry option field, the controller 160 controls the LCD monitor 170 such that every character of the second type is presented within the same entry option field.

Figure 8:
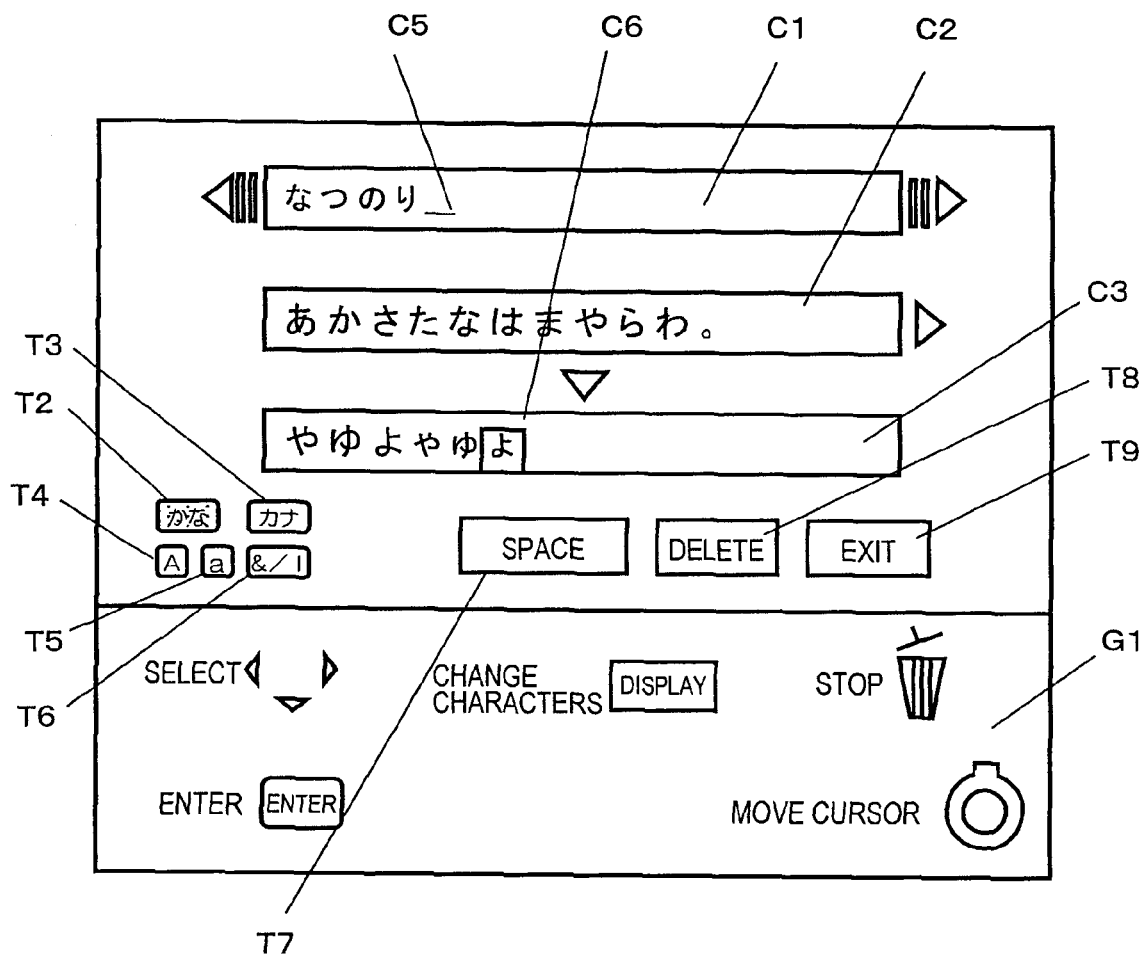
FIG. 8 illustrates how the dialog box looks when one of the characters, proposed in the second entry option field C3, needs to be selected.

FIG. 8 illustrates how the dialog box looks when one of the characters, proposed in the second entry option field C3, needs to be selected. In the example illustrated in FIG. 8, the first entry option field C2 is supposed to propose no characters that the user wants to select. In that case, the user needs to find his or her necessary character in the second entry option field C3. More specifically, the character "よ" cannot be selected from the first entry option field C2 but can be selected from the second entry option field C3.

Look at FIG. 4 again. When the user manipulates the keys 195 to 198 to move the cursor to the END button T9 and then presses the ENTER button 194 after having selected every character to enter while monitoring the entry dialog box, the controller 160 determines that the characters to be added to the image have been fixed (in Step S16). Then, the character string determined is stored in the header section of an image file under the control of the controller 160.

The controller 160 reads the character string and image data stored and presents them on the LCD monitor 170. More specifically, the controller 160 presents the image represented by the image data as background image and superimposes the character string, which has been read from the header section of the image file, on the image as OSD data (in Step S18). FIG. 9 illustrates a character string D3 superimposed on an image D2. In this manner, information about the image presented can be read out by performing a simple operation. It is preferably determined according to the user's preference whether the character string stored in the header section of an image file should be presented or not.

As described above, the digital camera 100 of this preferred embodiment uses the zoom lever 191 as an operating interface for moving the cursor in the entry box C1 and also uses the keys 195 to 198 as an operating interface for moving the cursor in the first, second and third entry option fields C2, C3 and C4.

In this manner, the user can not only move the cursor but also change the zoom powers of an image shot by turning the zoom lever 191 that is already provided for the digital camera 100. As a result, the cursor can be moved smoothly even without providing a lot of keys for the camera itself. On top of that, if the zoom lever 191 for changing the zoom powers of an image shot is used, then both the image zoom-in and zoom-out operations and the horizontal cursor move operations are performed in two directions. That is why the user can get the cursor move operations done intuitively.

Besides, the zoom lever 191 is arranged around the shutter release button 192 and the keys 195 to 198 are arranged on the rear side of the digital camera 100. Thus, the user can move the first cursor C5 with his or her index finger and move the second cursor C6 with his or her thumb. As a result, both of these two cursors C5 and C6 can be moved quickly with the two fingers.

Nevertheless, according to the present invention, the user may use any other fingers as long as the first cursor C5 is moved by turning the zoom lever 191 and as long as the second cursor C6 is moved by manipulating the keys 195 to 198, which are a different type of hardware interface from the zoom lever 191. In other words, if the first and second cursors C5 and C6 were moved with the same piece of hardware, then the technique would be no different from the conventional one.

The digital camera 100 described above can also function as an image manager, to/from which a storage medium is insertable and removable. The same can be said even if the storage medium is not the memory card 180 but a non-removable one that is built in the digital camera 100. In that case, the image manager includes an LCD monitor 170 that shows a character entry dialog box, an operating interface 190 that receives an instruction on what image file should be selected from the memory card 180, and a controller 160 for controlling the memory card 180 such that the character information that has been entered through the character entry dialog box gets stored in the header section of the image file that has been selected with the operating interface 190.

When instructed, by way of the operating interface 190, to select an image file, in which some character information has already been stored in its header section, as a target file to enter character information into, the controller 160 may read the character information from the header section of the selected image file and present it on the character entry dialog box. More specifically, suppose the character string "なつのりょこう(summer trip)" is stored in the header section of the image file. In that case, in showing the entry dialog box shown in FIG. 6, the controller 160 presents the character string "なつのりょこう" in the entry box C1 in advance and gets the character string ready to edit.

Then, even if the user has selected such an image file, in which a character string has already been stored in its header section, he or she no longer has to enter every character all over again, thus saving a lot of trouble in entering characters. On top of that, the user can also confirm what character string has been stored, and therefore, can avoid making errors in entering character information.

Also, in the preferred embodiment described above, the first entry option field C2 to propose representative characters is shown in the character entry dialog box. And if one of those representative characters has been selected, a group of characters belonging to the same group headed by that represen-
tative character are displayed. In this manner, even if a character system consisting of a lot of characters has been selected, only representative ones are proposed first so as to allow the user to make a selection easily. On the other hand, if another character system that consists of a smaller number of characters has been selected, all characters of that system are proposed at a time, thus reducing the trouble of getting the selection done. In any case, the user can choose characters more easily.

Furthermore, as in the example described above, both the representative characters proposed in the first entry option field C2 and the characters presented in the second entry option field C3 are preferably selectable. In that case, the selection can get done more easily.

It should be noted that according to the country or region in which the digital camera 100 is supposed to be used, there should be no need at all to show the first or second entry option field C2 or C3 and not all of the options T2 to T6 should be proposed, either. Or any other field or option could be provided if necessary. For example, if the digital camera 100 is supposed to be used in the United States, there is no need to propose the options T2 and T3 or to show the fields C2 and C3 shown in FIGS. 6 and 8, either.

Furthermore, in the preferred embodiment described above, the zoom lever 191 is supposed to turn around the shutter release button 192. However, this is just an example. As long as the operating interface can be used to zoom in on, or zoom out of, an image, the interface does not have to be a lever but may also be a button.

As described above, according to the present invention, any arrangement other than the one described above may be adopted as long as the first and second cursors C5 and C6 can be moved independently of each other with two different operating interfaces 190.

For that reason, although the zoom lever 191 is supposed to be used to move the first cursor C5 in the preferred embodiment described above, the present invention is in no way limited to that specific preferred embodiment. Alternatively, the first cursor C5 may also be moved with any other key that is used to perform a non-zooming function.

Furthermore, although the cross keys are used to move the second cursor C6 in the preferred embodiment described above, the present invention is in no way limited to that specific preferred embodiment. Alternatively, a joystick, a trackball or even speech recognition technique may be used for that purpose. In short, every operating interface 190 currently available may be used to move the cursor.

Optionally, the cross keys may be used to move the first cursor C5 and the zoom lever 191 may be used to move the second cursor C6.

The present invention is broadly applicable to any type of electronic device, to which characters can be entered and which is designed to manage images stored. Specifically, the present invention is applicable for use in digital cameras, digital movies and so on.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-215468 filed on Aug. 22, 2007 and No. 2000-207897 filed on Aug. 12, 2008, the entire contents of which are hereby incorporated by reference.

What is claimed is:

1. An image capture device comprising:
a display section to show a dialog box that allows the user of the device to edit character information, the dialog box including an entry option field where at least one character is proposed as an entry option and a selected character display field where characters that have been selected from those options are presented;
a first operating interface that allows the user to move a first cursor, which is located in the entry option field, within the dialog box; and
a second operating interface that allows the user to move a second cursor, which is located in the selected character display field, within the dialog box.

2. The image capture device of claim 1, wherein the device comprises a zooming interface that allows the user to change the sizes of a subject's image when the dialog box is not shown,
wherein the zooming interface is used as the second operating interface as well.

3. The image capture device of claim 2, further comprising a controller for controlling the movement of the second cursor as the second operating interface is manipulated, and
wherein the controller controls the directions in which the second cursor moves such that one of those directions is associated with an increase in the size of the subject's image, and the other direction is associated with a decrease in the size of the subject's image, caused by manipulating the zooming interface.

4. The image capture device of claim 1, further comprising:
a controller for controlling the movement of the first cursor as the first operating interface is manipulated and also controlling the mode of display of the dialog box; and
a third operating interface,
wherein the controller makes the display section propose multiple types of character options on the entry option field, select the type of the character where the first cursor is located as the third operating interface is manipulated, and change the entry option fields presented in the dialog box according to the type of the character selected.

5. The image capture device of claim 4, wherein the entry option field includes at least a first subfield and a second subfield, and
wherein if the characters that have been selected with the third operating interface have a character system including multiple characters that have been classified into multiple groups, then the controller makes the display section propose representative characters of the respective groups in the first subfield and also propose at least one more character, belonging to the same group as one of the representative characters that has been selected in the first subfield, in the second subfield.

6. The image capture device of claim 5, wherein as the first operating interface is manipulated, the controller selects the character that is displayed at the first cursor in at least one of the first and second subfields.

7. The image capture device of claim 4, wherein if the characters that have been selected with the first operating interface have a character system including multiple characters that are not classified into multiple groups, then the controller makes the display section present the multiple characters in the entry option field.

8. The image capture device of claim 4, wherein the first and third operating interfaces are mutually different types of hardware interfaces.

9. The image capture device of claim 4, wherein the first and third operating interfaces are the same type of hardware interfaces.

10. The image capture device of claim 1, wherein the first and second operating interfaces are mutually different types of hardware interfaces.

* * * * *